United States Patent [19]

Mann et al.

[11] Patent Number: 4,459,875
[45] Date of Patent: Jul. 17, 1984

[54] TRAVELLING DRIVE FOR ROAD ROLLERS, MORE PARTICULARLY WITH VIBRATORY SYSTEM

[75] Inventors: Egon Mann; Helmut Eymüller, both of Friedrichshafen, Fed. Rep. of Germany

[73] Assignee: Zahnradfabrik Friedrichshafen, AG, Friedrichshafen, Fed. Rep. of Germany

[21] Appl. No.: 269,802

[22] Filed: Jun. 3, 1981

[30] Foreign Application Priority Data

Jun. 6, 1980 [DE] Fed. Rep. of Germany ....... 3021323

[51] Int. Cl.³ ............................................. F16H 3/44
[52] U.S. Cl. ........................... 74/785; 74/797; 180/307; 180/308; 404/122
[58] Field of Search ............... 74/785, 797, 740, 730, 74/417; 92/12.2; 180/307, 308, 255; 404/122

[56] References Cited

U.S. PATENT DOCUMENTS

| 3,292,457 | 12/1966 | Horowitz | 74/730 |
|---|---|---|---|
| 3,469,646 | 9/1969 | O'Connor | 180/43 |
| 3,785,449 | 1/1974 | Ries | 180/6.48 |
| 3,800,901 | 4/1974 | Blomstrom et al. | 180/9.62 |
| 3,854,349 | 12/1974 | Michling | 74/740 |
| 3,943,789 | 3/1976 | Mann | 74/417 |
| 4,010,830 | 3/1977 | Logus et al. | 74/785 |
| 4,091,688 | 5/1978 | Huffman | 74/785 |
| 4,091,689 | 5/1978 | Huffman | 74/785 |
| 4,271,725 | 6/1981 | Takao et al. | 74/730 |
| 4,275,616 | 6/1981 | Ehrlinger et al. | 74/730 |

FOREIGN PATENT DOCUMENTS

| 2316932 | 10/1974 | Fed. Rep. of Germany | 74/785 |
|---|---|---|---|
| 2710708 | 9/1978 | Fed. Rep. of Germany | |
| 2831458 | 1/1980 | Fed. Rep. of Germany | |
| 1333986 | 12/1963 | France | 74/785 |

Primary Examiner—Allan D. Herrmann
Assistant Examiner—Joseph M. Rolnicki
Attorney, Agent, or Firm—Karl F. Ross; Herbert Dubno

[57] ABSTRACT

Each wheel of a road roller is provided with a drive which has a hydraulic motor with a radial output shaft coupled to the drive shaft of the wheel by bevel gearing. At one side of the housing containing the bevel gearing and the hydraulic motor, a brake is provided for the drive shaft whose opposite end is connected by a toothed coupling to the sun gear shaft of a planetary gearing transmission in a second housing disposed at least in part within the wheel. A flange of this transmission is connected to the planet carriers and to the wheel to rotate the latter.

4 Claims, 1 Drawing Figure

U.S. Patent  Jul. 17, 1984  4,459,875
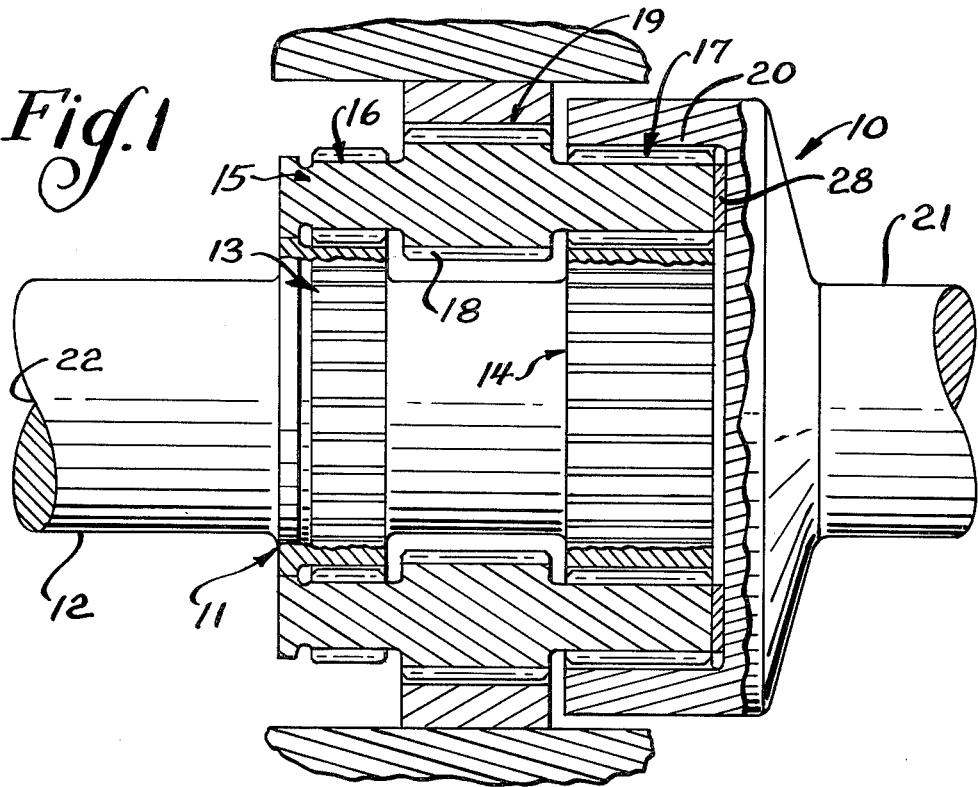
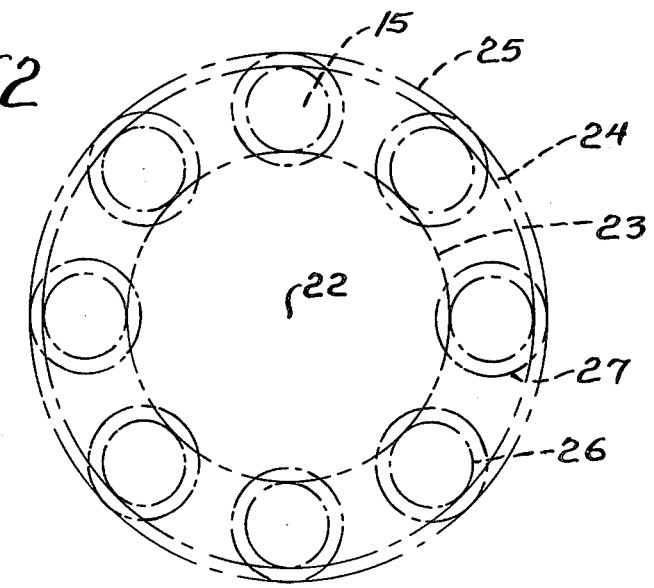

4,459,875

TRAVELLING DRIVE FOR ROAD ROLLERS, MORE PARTICULARLY WITH VIBRATORY SYSTEM

FIELD OF THE INVENTION

The invention relates to a travelling drive for road rollers and, more particularly to such a drive having a vibratory system, comprising a hydrostatic transmission.

BACKGROUND OF THE INVENTION

Hitherto road rollers have been driven via transmissions produced in series for other machines. This has meant that considerable compromises often had to be made.

However, the satisfactory drive of a road roller depends on recognition of certain pre-conditions, for example whether a one-part tire or a two-part tire is used, for equilization via a differential when taking curves, in order to treat the highway surface gently. In the case of tandem vibratory rollers also the overall axial space for the tire drive must be extremely small so as to provide a large bearing base for the vibratory drive and in order to support the actual roller as close as possible to the outer edge. The radial overall space is also limited by the tire diameter, to ensure dismountability if repairs are needed, in dependence on the arrangement of the hydraulic motor or gearing.

German Offenlegungsschrift-Patent Specification No. 28 31 458 discloses a wheel drive for hydrostatically driven processing machines, wherein the hydraulic motor and two planet pinion transmissions connected in series are disposed coaxially. This arrangement results in a relatively long overall axial construction which is unsuitable for road rollers for the reasons stated above.

OBJECT OF THE INVENTION

It is an object of the invention to provide a compact construction both axially and radially, since the drive must lie within the tire and must not project beyond the outer edge of the roller.

SUMMARY OF THE INVENTION

According to the invention the hydraulic motor must be integrated, so that the construction can be very compact radially also and so as to obtain enough unobstructed space for dismounting between the internal diameter, the tire and the hydraulic motor.

To this end the invention provides a travelling drive for road rollers having disposed in a drive casing a hydraulic motor, having an output shaft directed radially in relation to the axis of rotation of the road roller, a bevel gear drive, and a safety multiple-disc brake; flanged to the drive casing an output casing enclosing a planet pinion drive; a cover-shaped casing of the safety multiple-disc brake, including closure springs and a thrust piston for opening the brake flanged to the drive casing; disposed rotatably fixed on a spur bevel gear shaft disposed coaxially in relatin to the road roller, a spur bevel gear of the bevel gear drive and one part of the friction discs of the multiple-disc brake; a sun wheel of the planet pinion drive disposed in the output casing connected to the spur bevel gear shaft via shaft toothing. The output casing contains the hollow wheel toothing of the planet pinion drive and the bearing of the output flange in which the spindles of the planet pinions are disposed rotatably fixed. The advantage of a short overall construction is achieved by constructing the output casing as a hollow wheel and holder of the output bearing, and also by a direct connection to the drive casing.

Further contributions to the compact construction derive from the fact that the output flange is constructed as a planet pinion carrier and also by the arrangement of the safety multiple-disc brake on the spur bevel gear shaft of the bevel gear transmission. A further advantage of the travelling drive is that the safety multiple-disc brake is accessible without dismounting the transmission.

The inclusion of the radially arranged hydraulic motor in the travelling drive makes the construction compact in the radial direction also and leaves enough space for dismounting the parts of the kit assembly.

The hydraulic pump can be constructed about half the size when the traveling drive has two-point adjustment.

BRIEF DESCRIPTION OF THE DRAWING

The sole drawing is a cross-section through an embodiment of the travelling drive according to the invention.

SPECIFIC DESCRIPTION

A hydraulic motor 2 is disposed in a drive casing 1 radially in relation to the axis of rotation of a road roller (not shown).

Disposed on an output shaft 2.1 of the hydraulic motor 2 is a bevel pinion 3.1 of a bevel gear drive 3. Spur bevel gear 3.2 of the bevel gear drive 3 and one part of the friction discs 4.1 of a multiple-disc brake 4 are disposed rotatably fixed on a spur bevel gear shaft 3.3 disposed coaxially with the road roller. Via a shaft toothing 6.2, sun wheel 6.1 of a planet pinion drive 6 disposed in an output casing 5 is connected rotatably fast to the spur bevel gear shaft 3.3. The spur bevel gear shaft 3.3 is mounted on the one hand in the drive casing 1 via a bearing 3.5, being mounted on the other hand via a bearing 4.8 in cover 4.5 of casing 4.2 of the safety multiple-disc brake 4. That part of the friction discs 4.1 which is disposed on the bevel gear wheel shaft 3.5 is disposed rotatably fixed thereon via a shaft toothing 3.4. Disposed in brake casing 4.2 is a thrust piston 4.3 which can open the brake by pressure medium being supplied to piston chamber 4.6 via pressure medium line 4.7. Closure springs 4.4 of the brake 4 are accommodated in the cover 4.5, which is connected to the casing 4.2 via cover screws 15. The casing 4.2 of the safety multiple-disc brake 4 is connected via screws 14 to the drive casing 1. It, including all the parts which it incorporates, can be separated from the drive by removal of the screws.

An output casing 5 is flanged to the drive casing 1 and attached by means of connecting screws 13. A hollow wheel toothing 5.1 is worked into the output casing 5. Disposed between the hollow wheel toothing 5.1 and the sun wheel 6.1 are planet pinions 6.3 which are pivotably mounted on spindles 6.4. The spindles 6.4 are disposed rotatably fast on the one hand in output flange 7 and on the other hand in a bearing ring 6.5. The output flange 7 and the bearing ring 6.5 are pivotably mounted in the output casing 5 via solid roller bearings 7.1; 7.2. The output flange 7 can be constructed in several parts and attached via screws 16 to satellite carrier 7.3 to facilitate mounting on the tire. This also contributes towards the short construction. The output flange 7 is also sealed off from the output casing 5 by a seal 8. The clover-shaped seal, specially developed for this Application to obtain a short construction, with a rubber core and abrasion-resistant bearing, is disposed rigidly in a recess in the output flange 7 and presses resiliently against a chamfered surface of the output casing 5.

In order to meet varying torque demands, the hydraulic motor 2 can have an adjustment device 10 which is disposed in the control casing 9. The adjustment device 10 comprises a magnetic valve 10.1 and a piston which can be operated by low pressure and is connected via a connecting rod 11 to a tapered washer 12 of the hydraulic motor 2.

We claim:

1. An axially compact drive for a road wheel of a road roller, comprising:
    a first housing surrounding an axis of said wheel;
    a hydraulic motor having pistons reciprocatable radially of said axis and disposed in said first housing, and a motor output shaft extending radially of said axis;
    a drive shaft extending along said axis within said first housing;
    bevel gearing connecting said output shaft to said drive shaft for rotating said drive shaft;
    a friction brake mounted on said first housing at one said thereof and connected to said drive shaft for braking the rotation thereof;
    a second housing connected to said first housing on the side thereof opposite said friction brake;
    planetary gearing in said second housing including a sun gear, a second shaft axially aligned with said drive shaft and carrying said sun gear, planet gears meshing with said sun gear, a planet carrier carrying said planet gears, and a ring gear formed on said second housing and meshing with said planet gears, said second housing and said planetary gearing being disposed at least in part within said wheel;
    a toothed coupling interconnecting said drive shaft and said second shaft between said housings; and
    a multipartite drive flange connected to said wheel and to said planet carrier for driving said wheel, said planet carrier being subdivided axially into two axially spaced members each of which is journaled by a respective bearing independently of the other on said second housing, said sun gear being disposed between said members.

2. The drive defined in claim 1 wherein said flange is sealed with respect to said second housing outwardly of said bearings.

3. The drive defined in claim 1 wherein said brake is provided in a third housing attached to and dismountable from said first housing, a bearing for said drive shaft being provided in said third housing, a further bering being provided for said drive shaft in said first housing outwardly of said coupling.

4. The drive defined in claim 1 wherein said motor is provided with a control piston and a magnetic valve on said first housing.

* * * * *